Patented Sept. 12, 1944

2,358,234

UNITED STATES PATENT OFFICE 2,358,234

HYDROGENATION PROCESS

Wilbur A. Lazier, Wilmington, Del., assignor to E. I. du Pont de Nemours & Company, Wilmington, Del., a corporation of Delaware No Drawing. Application January 2, 1932, Serial No. 584,573

4 Claims. (Cl. 260—100)

This invention relates to catalytic processes for the production of organic compounds of an alcoholic character. More particularly it relates to a process for the catalytic reduction by means of elementary hydrogen of carboxylic acids or their derivatives to yield the corresponding alcohols or esters of the alcohols. Specifically, the invention relates to, and has as its principal object, the application of catalytic hydrogenation to the reduction of carboxylic ring compounds such as the naturally occurring naphthenic acids and their derivatives and carboxylic acids of the hydroaromatic series of organic compounds, and derivatives of the same.

This case is a continuation in part of my co-pending applications Serial No. 445,224, filed April 17, 1930; Serial No. 470,238, filed July 23, 1930; and Serial Nos. 520,473 and 520,474, both filed March 5, 1931.

For many years the only known method for the reduction of carboxylic acids to alcohols has been by purely chemical means. The most successful procedure is that outlined by Bouveault and Blanc in 1904. This process involves preparing an ester of the acid and the use of metallic sodium in absolute alcohol as the reducing agent. By this means alone it has been possible to prepare alcoholic derivatives of the naturally occurring naphthenic acids for the purpose of characterizing some of them. The method is so costly, however, as to render its use prohibitive for the manufacture of compounds which might otherwise be very useful in the arts.

Through the medium of processes fully described in the copending specifications to which reference has already been made, it has now become possible to realize on a commercial scale a technically and economically successful catalytic hydrogenation of simple carboxylic acids and their esters or other derivatives, whereby alcohols are formed which correspond in the number of carbon atoms with the acids used. Other products such as the saturated hydrocarbons and esters of the newly formed alcohols may also be prepared in this way.

It has now been found, in accordance with the present invention, that organic carboxylic compounds in which the carboxylic group is attached directly to a saturated or partially saturated ring of carbon atoms are amenable to catalytic hydrogenation to the corresponding hydroxyl derivatives when subjected to treatment with an excess of hydrogen at high temperatures and pressures in the presence of a suitable hydrogenating catalyst.

A broad object of the invention relates to the production of alicyclic alcohols by the catalytic hydrogenation of alicyclic carboxylic acids. A more specific object resides in effecting this conversion by the use of compound catalysts consisting of a mixture of hydrogenating metal chromites. Other objects of the invention will become more apparent from the following description of the invention.

According to a preferred embodiment of the invention a cyclic carboxylic compound is either heated in an autoclave in the presence of a hydrogenation catalyst under high hydrogen pressure, or else the compound or mixture to be hydrogenated is permitted to flow over a heated catalyst in a continuous manner together with an adequate supply of compressed hydrogen.

The following examples will illustrate in greater detail how the invention may be carried out in practice:

Example 1

A zinc oxide-copper-kieselguhr catalyst for use in the hydrogenation of esters is prepared in the following manner: To a solution containing zinc nitrate and copper nitrate in equimolar proportions there is added an excess of ammonium hydroxide. The precipitate formed at first redissolves in the excess of the reagent. Kieselguhr is then added to the solution to the extent of 100 g. per mole of metallic salts present and the whole charge is heated to 80° C. At this temperature air is passed through the suspension until the excess ammonia is discharged. The precipitate is washed, filtered, and dried and reduced at 250°–300° C. in a stream of diluted hydrogen for about 10 hours.

A high-pressure autoclave is charged with 400 g. of the ethyl ester of hexahydroorthotoluic acid and 40 g. of the zinc oxide-copper-kieselguhr catalyst prepared as described above. Compressed hydrogen is introduced until a pressure of about 250 atmospheres is reached. The contents of the autoclave is heated 6 hours with stirring at a temperature of 325° C., a high hydrogen pressure being maintained by introduction of a fresh supply of gas. Hydrogen is rapidly absorbed as evidenced by the steady fall in pressure. Reduction of the carbethoxy group proceeds smoothly with the formation of ethanol and 2-methyl cyclohexyl carbinol. The yields are 50–70%.

Similarly, hexahydroethyl benzoate may be reduced to cyclohexyl carbinol, and the hydrogenated naphthoates and hydrogenated anthroates to the corresponding alcohols.

Example 2

A composite hydrogenation catalyst is prepared as follows: A solution is prepared by dissolving 245 parts by weight of crystallized zinc nitrate, 25 parts of hydrated cadmium nitrate and 25 parts of copper nitrate (trihydrate) in about 750 parts of water. A second solution is prepared by mixing 100 parts by weight of chromic anhydride (CrO₃) in 500 parts of water and then adding 135 parts of 28% ammonium hydroxide. Precipitation of the hydrogenating metals of the first solution as chromates is effected by stirring and adding the second solution at room temperature. The mixture is exactly neutralized with additional ammonium hydroxide and allowed to settle. The clear supernatant liquid is poured off and the precipitate is washed several times by decantation with an adequate volume of wash water, after which it is filtered and dried at about 100° C. The next step consists of igniting the dried filter cake at 400° C. for four hours. This process converts the double ammonium chromates of copper, zinc and cadmium to metallic chromites in which form they are employed as catalysts. Suitable physical form is obtained by granulating the friable chromite powder and briquetting it into the form of tablets which are crushed and screened 8-14 mesh.

One hundred cc. of the catalyst is placed in a steel reaction vessel capable of withstanding high pressures. The tube and catalyst are heated slowly to 400° C. with a stream of hydrogen flowing over the catalyst. The exit valve is closed and the pressure allowed to build up to 3000 lbs./sq. in. At this temperature and pressure a 50% solution of benzene and distilled naphthenic acids (obtained from petroleum) is pumped over the catalyst at the rate of about 200 cc. per hour, while hydrogen is simultaneously drawn through the system at the rate of about 10 cu. ft. per hour as measured at ordinary conditions of temperature and pressure at the exit of the reaction system. The pressure is controlled at a constant value by maintaining a large supply of hydrogen at the required pressure. The flow of naphthenic acid-benzene mixture is controlled by the rate of pumping, and the hydrogen flow is regulated by manipulation of the gas expansion valve at the end of the reaction system. The liquid products are separated under pressure from the unused hydrogen by passage through a cooled trap.

The liquid condensate obtained is very nearly equal in volume to the raw material introduced. The more volatile benzene is distilled off leaving a residue consisting of the reduction products of the naphthenic acids, i. e., naphthenic alcohols (and under favorable circumstances, esters as well). These materials may be further characterized by determination of the usual oil constants. In a typical experiment the sample of naphthenic acid used had an acid number before treatment of about 115. After hydrogenation, the acid number was only about 5. The product was practically free from esters and had an acetyl number of 67. These data indicate a very complete reduction of the carboxyl groups and the appearance of hydroxylated compounds as the major products of the reaction. Naphthenic alcohols thus prepared have the properties of a rather viscous fluid. This material may be further modified by etherification, esterification, etc.

*Example 3*

A copper chromite catalyst is prepared by igniting copper ammonium chromate and briquetting the residual chromite composite. A solution of 500 g. of hexahydrobenzoic acid dissolved in two liters of hot absolute alcohol is passed over this catalyst together with an amount of hydrogen equal to 20 times that necessary for complete reduction of the carboxylic acid. The temperature is maintained at 385° C. and the pressure on the reaction system is held between 2500 and 3000 lbs./sq. in. The rate of flow of the acid solution is 150 cc./hour. The conditions for the reaction are controlled and the product collected as described in Example 2.

The reaction products are characterized by a low acid and saponification number indicating substantial conversion of the free acid to alcohol. After evaporation of the ethanol, cyclohexyl carbinol is obtained as the major product of the reaction.

Other carboxylic acids derived from the terpenes or naphthenes, for example camphoric acid or the hexahydro phthalic acids, may be similarly reduced.

*Example 4*

Rosin consists essentially of abietic acid, a compound containing partially unsaturated ring structures and carboxyl groups. The unsaturation of abietic acid may be reduced by hydrogenation in the presence of a nickel catalyst at moderate temperatures and pressures by the well known technique developed for the hardening of vegetable oils.

The following procedure, however, is necessary in order to effect reduction of the carboxyl groups: An autoclave is charged with 200 g. of hydroabietic acid, 100 g. of toluene, and 15 g. of a nickel-chromium oxide catalyst prepared by the reduction of nickel chromate with hydrogen at a temperature of 500° C. for a period of about 4 hours. The rosin mixture is hydrogenated at a temperature of 300°–350° C. and under a hydrogen pressure of 100–300 atmospheres. The alcoholic and hydrocarbon derivatives are obtained by evaporation of the solvent.

Instead of rosin, equally good results may be obtained in the hydrogenation of ethyl abietate or glyceryl abietate otherwise known as ester gum.

The present invention is applicable to a wide variety of organic acids and acid derivatives containing ring structures. In particular it is applicable to carboxylic compounds belonging to the class known as "alicyclic" compounds (Encyclopaedia Britannica, 14th edition, volume 5, page 370). The alicyclic carboxylic compounds may be those derived from the corresponding hydrocarbons by substituting a carboxyl group for a hydrogen atom attached to a carbon atom contained in the ring. The invention may also be applied to the reduction of carboxylic acid compounds derived from hydroheterocyclic compounds, i. e., hydrocyclic compounds containing elements other than carbon in the ring, by substitution of the carboxy group for a hydrogen atom. Examples of hydroheterocyclic carboxylic acids to which the invention can be applied are piperidine carboxylic acid, tetrahydro furoic acid, etc. Whereas no reference has been made to the catalytic hydrogenation of compounds in which carboxylic groups are attached to carbon rings of the benzenoid type, it is to be fully understood and appreciated that the same result may be achieved indirectly by first hydrogenating the benzenoid structure by known means to the corresponding hydro derivative, after which the carboxy groups are readily amenable to reduction according to the methods of this invention.

By the terms "acid derivatives" and "carboxylic compounds" I mean to include only compounds containing the group

and such other carbonyl-containing compounds as may yield the group

when subjected to hydrolysis. As examples of such acid derivatives, mention may be made of esters, including esters of glycerine as well as the esters of monohydric alcohols, acid chlorides, acid amides, salts, and acid anhydrides, all of which are applicable to the present invention.

The process of this invention is applicable to synthetic acids such as may be prepared from aromatic acids by hydrogenation of the benzene ring. It is also applicable to the large class of complex acids that may be isolated from petroleum and are known as "naphthenic acids." The process is applicable also to other complex cyclic acids and their derivatives such as may be found among the synthetic or naturally occurring terpenes and in various gums.

The process of the present invention is characterized by the use of an excess of hydrogen at temperatures and pressures somewhat higher than those ordinarily employed for such liquid phase hydrogenations as are carried out for the purpose of hardening fats and fatty acids.

The temperatures and pressures used in the above examples are illustrative only. Temperatures ranging from about 200° C. up to the decomposition temperatures of the reaction products may be used, although temperatures of about 300°-400° C. are preferable. Pressures ranging from about 10 atmospheres up to the limit which the apparatus will withstand are suitable. The preferred pressure is within the range of about 100-250 atmospheres and depends upon the acid or acid derivatives treated, upon the degree of hydrogenation desired, and the desired freedom from by-products.

The ratio of hydrogen to the carboxylic acid or the acid derivatives may be varied over a wide range; but I prefer to use a substantial molecular excess of hydrogen. Where a flow process is used, I prefer to employ about 2 to 10 moles of hydrogen per mole of the material undergoing treatment.

The rate at which the material to be hydrogenated may be passed over the catalyst where a flow process is used, is a function of the molecular weight of the material and of the catalytic activity of the contact mass. Ordinarily the rate will vary from 2 to 8 volumes per hour per unit of volume of catalyst, but higher rates may be employed at the expense of slightly lower rate of conversion.

The acid or its derivative may be employed in liquid form or if it is a solid, it may be dissolved in a suitable solvent. Mixtures of acids, etc., may be reduced as well as the single compounds.

While the catalyst previously described is preferred because of the high conversion obtained, it is to be understood that other suitable hydrogenating catalysts can be used. The catalyst composition contributes in an important way to the yield of alcohols and freedom from side reactions, but it is only necessary to employ any good hydrogenation catalyst under the conditions described in order to effect the reduction of acids. Such a catalyst may be composed of one or more metals or metal oxides prepared in an active form and preferably selected from the group known as the hydrogenating metals or metal oxides. Some well known members of this group are copper, cadmium, nickel, cobalt, tin, zinc oxide, magnesium oxide, and manganese oxide. These may be combined with promoters of the oxide type in the form of mixtures or compounds with the same. In general the catalysts which have found use in methanol synthesis are applicable to the present process. Particularly good results have been obtained in acid hydrogenation by preparing such a catalyst according to the method described in U. S. Patent 1,746,783, wherein a double ammonium chromate of a hydrogenating metal is heated to form a chromite catalyst. As indicated in the examples success has attended the use of mixtures of the chromites of two or more hydrogenating metals. The catalyst composition disclosed in my copending application Serial No. 470,238, filed July 23, 1930, are eminently suited to use in the present invention. I prefer to use a chromite composition consisting substantially of zinc chromite but containing lesser quantities of the chromates or chromites of copper and cadmium.

As has been stated, the process may be operated to produce alcohols and/or esters. A high rate of flow and lower operative temperatures favor the formation of esters, whereas conditions tending to cause more complete hydrogenation, i. e., a low rate of flow and higher temperatures favor the formation of alcohols.

By means of the above described invention, the usefulness of the synthesis of alcohols from acids has been greatly amplified. Acids are generally more plentifully found in nature than the corresponding alcohols. Naphthenic acids, for example, occur abundantly in petroleum. By means of catalytic reduction it is possible to make the corresponding alcohols available for a wide number of applications in the art. By combining hydrogenation of the aromatic nucleus with that of the carboxyl group it is possible to prepare economically a multitude of new synthetic alcohols of the cyclohexane series.

The above description and specific examples are to be considered as illustrative only and not as limiting the scope of the invention. Any modification or variation therefrom which conforms with the spirit of the invention is intended to be included within the scope of the claims.

I claim:

1. The process of producing high molecular alcohols which comprises reducing hydroabietic acid with hydrogen in the presence of a hydrogenating catalyst and at a temperature of at least 300° C. to 400° C. and a pressure of at least 10 atmospheres.

2. The method of producing a resin alcohol which comprises effecting reduction of a carboxyl group of hydrogenated abietic acid to an alcohol group by treatment with hydrogen in the presence of a hydrogenation catalyst and under a temperature above about 200° C. and a pressure of at least 100 atmospheres.

3. The process of claim 2 wherein the hydrogenation catalyst contains chromium oxide and a catalytically hydrogenating metal.

4. The process of claim 2 wherein the hydrogenation catalyst contains chromium oxide and nickel.

WILBUR A. LAZIER.